United States Patent
Fox et al.

(10) Patent No.: US 11,526,514 B2
(45) Date of Patent: Dec. 13, 2022

(54) REQUEST ORCHESTRATION

(71) Applicant: MASTERCARD TECHNOLOGIES CANADA ULC, Vancouver (CA)

(72) Inventors: Justine Celeste Fox, Pitt Meadows (CA); Marc Grimson, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 192 days.

(21) Appl. No.: 16/996,133

(22) Filed: Aug. 18, 2020

(65) Prior Publication Data

US 2022/0058192 A1 Feb. 24, 2022

(51) Int. Cl.
*G06F 16/2455* (2019.01)
*G06F 16/248* (2019.01)
*G06F 16/27* (2019.01)
*G06F 16/951* (2019.01)

(52) U.S. Cl.
CPC ........ *G06F 16/2455* (2019.01); *G06F 16/248* (2019.01); *G06F 16/27* (2019.01); *G06F 16/951* (2019.01)

(58) Field of Classification Search
CPC .... G06F 16/2455; G06F 16/27; G06F 16/951; G06F 16/248
USPC .......................................................... 707/718
See application file for complete search history.

(56) References Cited

U.S. PATENT DOCUMENTS

| | | | |
|---|---|---|---|
| 8,271,527 B2 * | 9/2012 | Frieder | G06F 21/6218 707/783 |
| 8,898,267 B2 * | 11/2014 | Slik | G06F 16/1844 709/221 |
| 9,970,769 B2 * | 5/2018 | Pfeifle | G01C 21/32 |
| 10,922,493 B1 * | 2/2021 | Das | G06F 16/243 |
| 11,076,205 B2 * | 7/2021 | Walker | H04L 65/1089 |
| 2005/0234969 A1 * | 10/2005 | Mamou | G06Q 10/10 707/999.102 |
| 2005/0235274 A1 * | 10/2005 | Mamou | G06F 16/254 717/136 |
| 2005/0240592 A1 * | 10/2005 | Mamou | G06Q 10/10 707/999.009 |
| 2006/0010195 A1 * | 1/2006 | Mamou | G06Q 10/10 709/203 |

(Continued)

OTHER PUBLICATIONS

International Search Report and Written Opinion for Application No. PCT/CA2021/051120 dated Oct. 19, 2021 (8 pages).

(Continued)

*Primary Examiner* — Hanh B Thai
(74) *Attorney, Agent, or Firm* — Michael Best & Friedrich LLP (57) ABSTRACT

Methods and systems for request orchestration. One system includes an electronic processor configured to receive a request including request metadata and identify a data attribute associated with the request. The electronic processor is also configured to determine an execution plan for enriching the request metadata based on the data attribute. The electronic processor is also configured to execute an application function according to the execution plan to enrich the request metadata. The electronic processor is also configured to evaluate the enriched request metadata. The electronic processor is also configured to generate and transmit a response to the request based on the evaluation of the enriched request metadata.

20 Claims, 5 Drawing Sheets

(56) References Cited

U.S. PATENT DOCUMENTS

| | | | |
|---|---|---|---|
| 2006/0069717 A1* | 3/2006 | Mamou | G16H 40/20 |
| | | | 709/203 |
| 2011/0264530 A1* | 10/2011 | Santangelo | H04L 67/53 |
| | | | 370/352 |
| 2013/0238540 A1 | 9/2013 | O'Donoghue et al. | |
| 2015/0256903 A1* | 9/2015 | Walker | H04L 65/613 |
| | | | 725/32 |
| 2016/0055142 A1* | 2/2016 | Strassner | G06F 40/205 |
| | | | 707/755 |
| 2016/0092557 A1 | 3/2016 | Stojanovic et al. | |
| 2017/0097238 A1* | 4/2017 | Pfeifle | G06F 16/2219 |
| 2018/0196836 A1* | 7/2018 | Sundaram | G06F 16/9024 |
| 2019/0317776 A1* | 10/2019 | Walsh | H04L 41/5096 |
| 2019/0320012 A1* | 10/2019 | Walsh | H04L 41/5054 |
| 2020/0026710 A1* | 1/2020 | Przada | G06N 20/00 |
| 2020/0394085 A1* | 12/2020 | Mercuri | G06F 16/2379 |

OTHER PUBLICATIONS

Fukuljac et al., "A Service for Metadata Enrichment for Video on Demand Systems", IEEE 5th International Conference on Consumer Electronics Berlin, 2015, pp. 43-45.

* cited by examiner

REQUEST ORCHESTRATION

FIELD

Embodiments described herein relate to request orchestration.

BACKGROUND

In many applications, there is a need to support asynchronous data lookups and adapt application functionality based on request attributes. For example, when a request is received, particular application functionality may be triggered based on the request attributes. As a specific example, when the request includes an IP address, a related data lookup may be triggered for the IP address, such as a billing address associated with the IP address. The billing address may be used to enrich the request for request validation (i.e., to request that an address associated with the IP address is the same as the billing address). However, typical approaches are hardcoded and do not take into consideration consistent feature flags or regional compliance regulation. Accordingly, these approaches struggle to scale to millions of requests per second without specialized strategies. Additionally, update mechanisms used in traditional approaches require full application deployment to modify functionality that are actively used by applications or customers.

SUMMARY

Embodiments described herein provide for request orchestration to manage application functionality and add request metadata for machine learning applications. The embodiments described herein leverage dynamic information to trigger different application code paths. For example, embodiments described herein review data attributes in a request (or request metadata) and trigger application functionality associated with the data attributes, such as enriching request metadata based on what data attributes are included in the request metadata. In some embodiments, application functionality is configured to time out, report missing data attributes, report failures, and the like such that performance objectives may be maintained in the event of an issue. Accordingly, the embodiments described herein identify request data attributes, asynchronously enrich request data attributes, and perform request evaluation.

More specifically, in embodiments, data attributes of a received request are inspected in order to determine a plan for executing application functionality (for example, a plan for orchestrating requests associated with executing the application functionality triggered by the data attributes). After determining the plan (or request orchestration), the application functionality is executed according to the determined plan. For example, when a request includes an IP address and a user agent, embodiments described herein may determine a plan for executing a data lookup associated with the IP address and a data lookup associated with the user agent. This may be done to, for example, ultimately compare certain data associate with the lookups to determine if the request is coming from a valid user. The plan may include requesting data related to the IP address from a GeoIP database and then requesting data related to the user agent from a user agent database. After determining the plan for executing the data lookups, embodiments described herein then execute the data lookups by, for example, transmitting the requests to the databases according to the plan (or request orchestration). The results from performing the data lookups may be used to enrich the request (i.e., added or supplemented to the request metadata). The results may include, for example, a physical location associated with the IP address and additional user agent information associated with the user agent. The enriched request may then be evaluated (for example, the validity of the user determined) based on, for example, the supplemented results of the data lookups, the original request metadata (i.e., the IP address and the user agent), or a combination thereof.

Additionally, embodiments described herein provide for customizing application functionality on demand without impacting regular system operations. In other words, updates to application functionality do not directly impact application functionality, and, thus, enables incremental functionality growth and extension, such as incremental improvements to an application programming interface (API).

One embodiment provides a system for request orchestration. The system includes an electronic processor configured to receive a request including request metadata. The electronic processor is also configured to identify a data attribute associated with the request. The electronic processor is also configured to determine an execution plan for enriching the request metadata based on the data attribute. The electronic processor is also configured to execute an application function according to the execution plan to enrich the request metadata. The electronic processor is also configured to evaluate the enriched request metadata. The electronic processor is also configured to generate and transmit a response to the request based on the evaluation of the enriched request metadata.

Another embodiments provides a method for request orchestration. The method includes receiving a request including request metadata. The method also includes identifying, with an electronic processor, a set of data attributes associated with the request. The method also includes determining, with the electronic processor, an execution plan for enriching the request metadata based on the set of data attributes. The method also includes executing, with the electronic processor, one or more application functions according to the execution plan to enrich the request metadata. The method also includes evaluating, with the electronic processor, the enriched request metadata. The method also includes generating and transmitting, with the electronic processor, a response to the request based on the evaluation of the enriched request metadata.

Yet another embodiment provides a non-transitory, computer-readable medium storing instructions that, when executed by an electronic processor, perform a set of functions. The set of functions includes receiving a request including request metadata. The set of functions also includes identifying a set of data attributes associated with the request, the set of data attributes including a first data attribute and a second data attribute. The set of functions also includes determining an execution plan for enriching the request metadata based on the set of data attributes, where the execution plan includes a first application function associated with the first data attribute and a second application function associated with the second data attribute. The set of functions also includes executing the first application function and the second application function according to the execution plan to enrich the request metadata. The set of functions also includes evaluating the enriched request metadata. The set of functions also includes generating and transmitting a response to the request based on the evaluation of the enriched request metadata.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
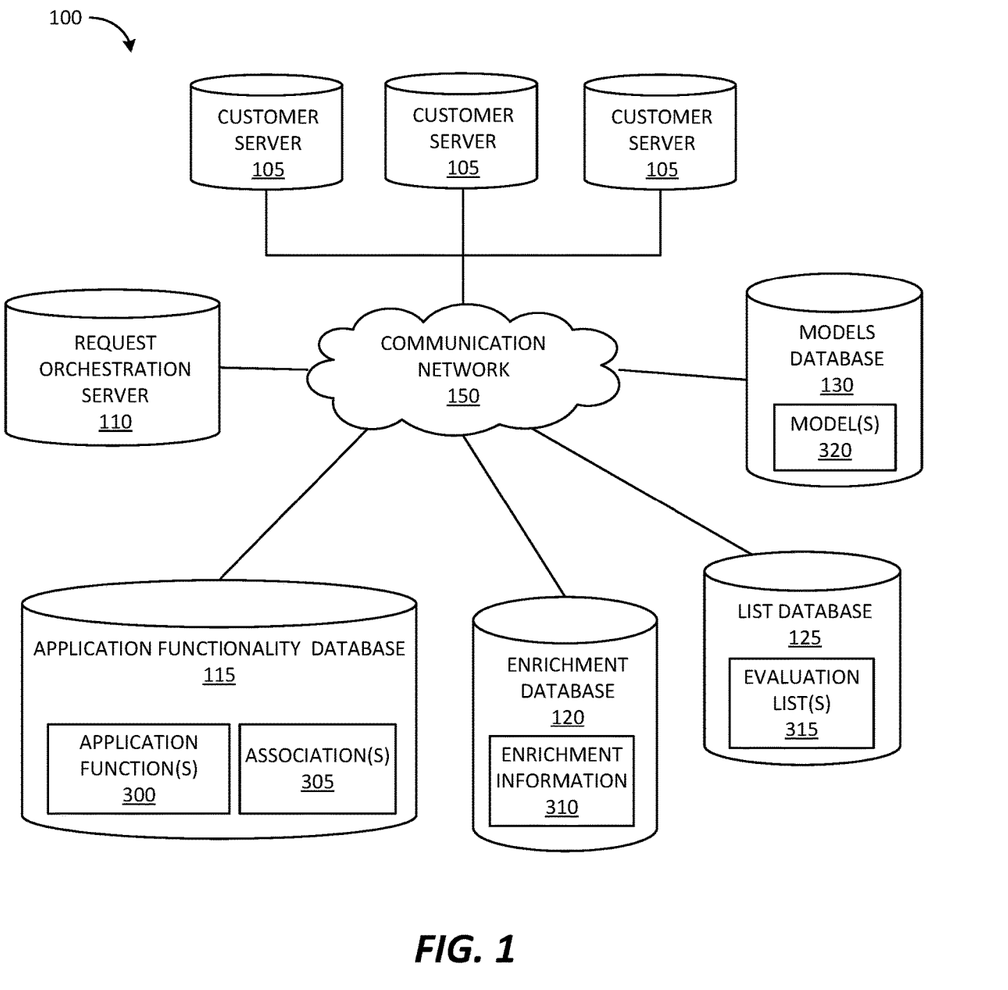
FIGS. 1-2 are block diagrams of a system for request orchestration according to some embodiments.

FIG. 1 is a block diagram of a system 100 for request orchestration. In the example shown, the system 100 includes a customer server 105, a request orchestration server 110, an application functionality database 115, an enrichment database 120, a list database 125, and a models database 130. In some embodiments, the system 20 includes fewer, additional, or different components than illustrated in FIG. 1. For example, the system 100 may include multiple customer servers 105, multiple request orchestration servers 110, multiple application functionality databases 115, multiple enrichment databases 120, multiple list databases 125, multiple models databases 130, or a combination thereof. Also, in some embodiments, the application functionality database 115, the enrichment database 120, the list database 125, the models database 130, or a combination thereof may be included in the request orchestration server 110, the customer server 105, or a combination thereof and one or more of the components of the system 100 may be distributed among multiple databases or servers.

Figure 2:
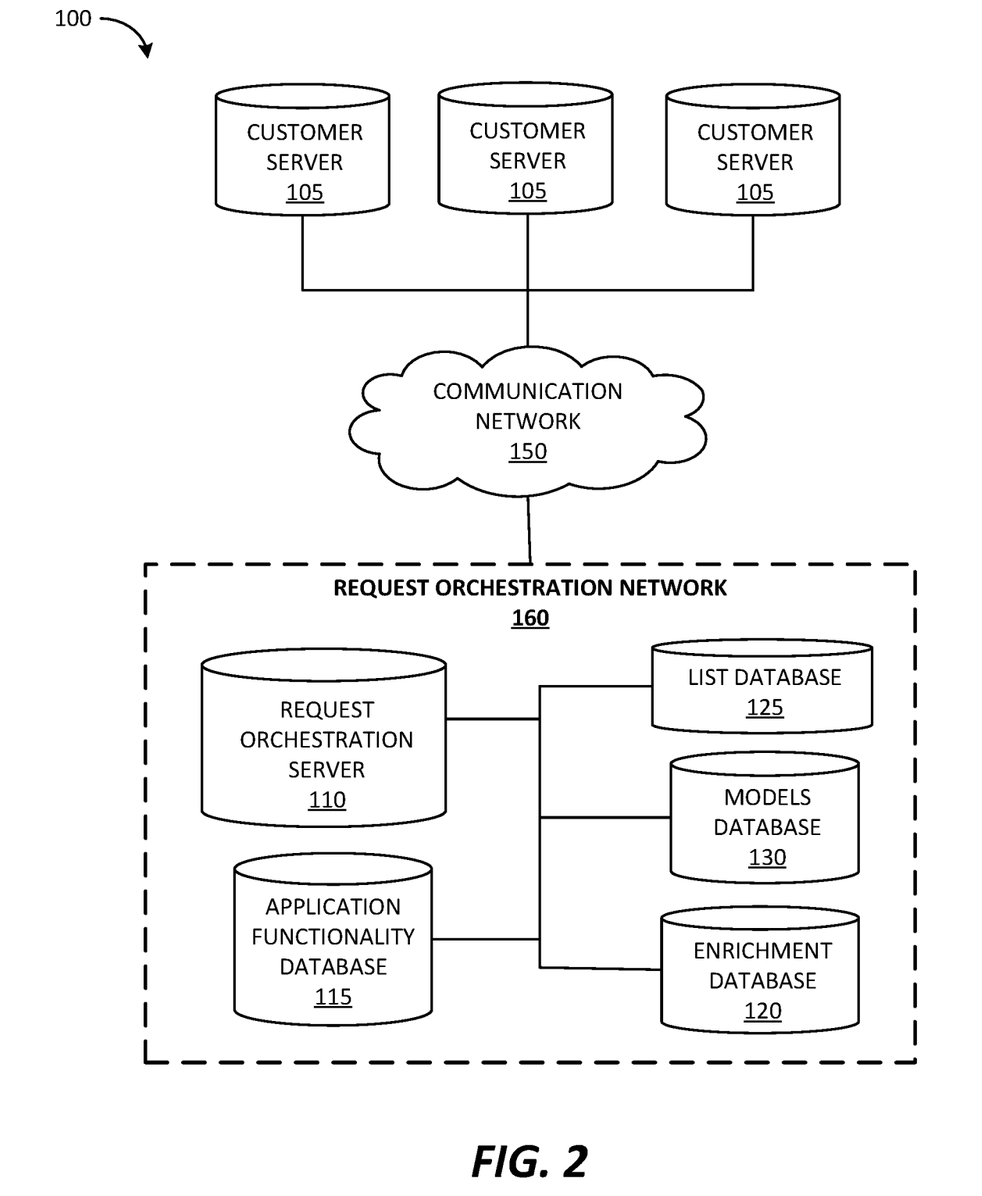

The customer server 105, the request orchestration server 110, the application functionality database 115, the enrichment database 120, the list database 125, and the models database 130 communicate over one or more wired or wireless communication networks 150. Portions of the communication networks 150 may be implemented using a wide area network, such as the Internet, a local area network, such as a Bluetooth™ network or Wi-Fi, and combinations or derivatives thereof. Alternatively or in addition, in some embodiments, the components of the system 100 communicate through one or more intermediary devices not illustrated in FIG. 1. Also, in some embodiments, components of the system 100 (or a portion thereof) communicate directly as compared to through the communication network 35. For example, in some embodiments, the request orchestration server 110, the application functionality database 115, the enrichment database 120, the list database 125, and the models database 130 form a request orchestration network 160 providing a cloud service or cloud-computing environment, as illustrated in FIG. 2.

Figure 3:
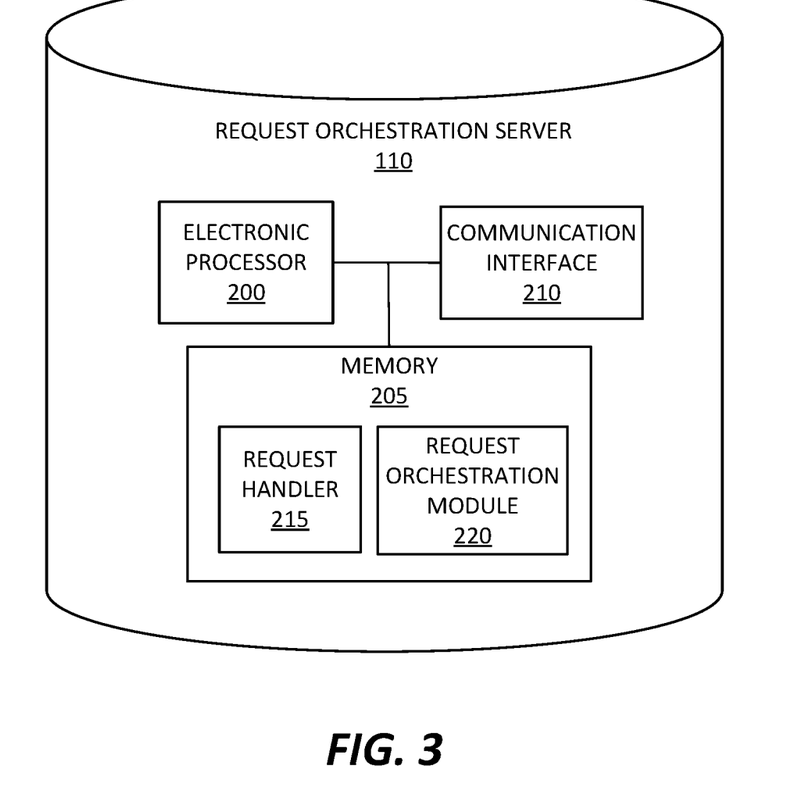
FIG. 3 is a block diagram of a server of the system of FIG. 1 according to some embodiments.

As illustrated in FIG. 3, the request orchestration server 110 includes an electronic processor 200 (for example, a microprocessor, an application-specific integrated circuit (ASIC), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the request orchestration server 110 may include additional components than those illustrated in FIG. 3 in various configurations and may perform additional functionality than the functionality described herein. For example, in some embodiments, the functionality described herein as being performed by the request orchestration server 110 may be distributed among servers or devices (including as part of services offered through a cloud service), may be performed by one or more customer servers 105, or a combination thereof.

The communication interface 210 allows the request orchestration server 110 to communicate with devices external to the request orchestration server 110. For example, as illustrated in FIG. 1, the request orchestration server 110 may communicate with the customer server 105, the application functionality database 115, the enrichment database 120, the list database 125, the models database 130, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 150, such as the Internet, local area network ("LAN"), a wide area network ("WAN"), and the like), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 3, the memory 205 may store a request handler 215 and a request orchestration module 220. The request handler 215 (via the electronic processor 200 executing instructions) handles requests, such as requests received from the customer server 105, and constructs (or generates) responses to the requests. The request orchestration module 220 (via the electronic processor 200 executing instructions) identifies one or more data attributes in a request and triggers application functionality associated with the identified one or more data attributes.

As illustrated in FIG. 1, the application functionality database 115 stores a plurality of application functions 300 (referred to herein collectively as "the application functions 300" and individually as "an application function 300"). An application function 165 may also be referred to herein as a function, application functionality, or an application functionality code path. An application function 300 may include, for example, a lookup function, a data query function, or the like. In some embodiments, an application function 300 may be configured to time out, report missing data attributes, report failures, or a combination thereof. An application function 300 may be a customized function. The application functionality database 115 also stores a plurality of associations 305 (referred to herein collectively as "the associations 305" and individually as "an association 305"). An association 305 may also be referred to herein as a mapping. An association 305 may include, for example, mapping between an application function 300 and a particular data attribute.

The enrichment database 115 stores enrichment information 310. The enrichment information 310 is additional or supplemental information associated with a particular data attribute, data attribute type, or a combination thereof. The enrichment information 310 may include, for example, velocity or count information, GeoIP information, user agent information, fraud health information, and the like. As one example, when the data attribute is a virtual location of a request, such as an Internet Protocol (IP) addresses, the enrichment information 310 may include a physical location, such as a billing address, associated with the virtual location.

The list database 120 stores a plurality of evaluation lists 315 (referred to herein collectively as "the evaluation lists 315" and individually as "an evaluation list 315"). An evaluation list 315 may also be referred to herein as a list. An evaluation list 315 may include, for example, an allow list, a block list, a reputation list, and the like. An allow list includes a listing of data attributes that, when a request is associated with one or more of the listed data attributes, application behavior relating to the request is allowed. For example, when a request is associated with an IP address included in an allow list is received, the request may be validated or allowed. A block list includes a listing of data attributes that, when a request is associated with one or more of the listed data attributes, application behavior relating to the request is not allowed. For example, when a request is associated with an IP address included in the block list is received, the request may be invalidated or not allowed. A reputation list includes a listing of identifiers, such as IP addresses. Each identifier included in the reputation list is associated with a reputation metric. A reputation metric indicates a reputation of the corresponding identifier. For example, a reputation metric may provide an indication of how suspicious previous activity associated with an identifier has been. For example, the reputation list may include an IP address (an identifier) that is associated with a negative reputation metric because suspicious activity is associated with that IP address.

The models database 130 stores a plurality of models 320 (referred to herein collectively as "the models 320" and individually as "a model 320"). A model 320 may also be referred to herein as a machine learning model or an artificial intelligence model. A model 320 may be used to evaluate or validate a request (or data attributes thereof). The models 320 may have been developed (via a learning engine) using one or more machine learning functions. Machine learning functions are generally functions that allow a computer application to learn without being explicitly programmed. Machine learning may be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms.

The customer server 105 may provide an application (or service) to a user (for example, an end user, a group of users, an organization, another user entity, and the like). The user may interact with the customer server 105 either directly or indirectly via one or more intermediary devices (not shown). In some embodiments, the customer server 105 is part of a computing network, such as a distributed computing network, a cloud computing service, or the like. In such embodiments, the customer server 105 may communicate with the request orchestration network 160 or a component thereof (for example, the request orchestration server 110) as part of providing a cloud-based service to a user using an intermediary device (not shown). Alternatively or in addition, the customer server 105 may be a user device used directly by a user to interact with the request orchestration network 160 or a component thereof. For example, the customer server 105 may be a computing device, such as a desktop computer, a terminal, a workstation, a laptop computer, a tablet computer, a mobile device, or the like.

The customer server 105 may interact with the request orchestration network 160 or a component thereof to leverage or access application functionality supported or provided by the network 110. In some embodiments, the request orchestration network 160 or a component thereof supports a web application, such as a financial services application, that provides financial services such that a user may access a corresponding user account to interact with and manage financial transactions, services, data, and the like. Alternatively or in addition, in some embodiments, the request orchestration network 160 or a component thereof supports a web application providing supplemental functionality for a different application, such as supplemental security functions or mechanisms for a financial services application. For example, the request orchestration network 160 or a component thereof may support request orchestration functionality, request validation functionality, fraud detection and monitoring functionality, and the like for a financial services application supported by one or more of the customer servers 105.

Although not illustrated, the customer server 105, the application functionality database 115, the enrichment database 120, the list database 125, and the models database 130 may include similar components as the request orchestration server 110 (an electronic processor, a memory, and a communication interface). However, in some embodiments, the customer server 105, the application functionality database 115, the enrichment database 120, the list database 125, the models database 130, or a combination thereof includes additional, fewer, or different components that the request orchestration server 110. For example, although not illustrated, the customer server 105 may include a human-machine interface including one or more input devices, one or more output devices (for example, a display device), or a combination thereof.

Figure 4:
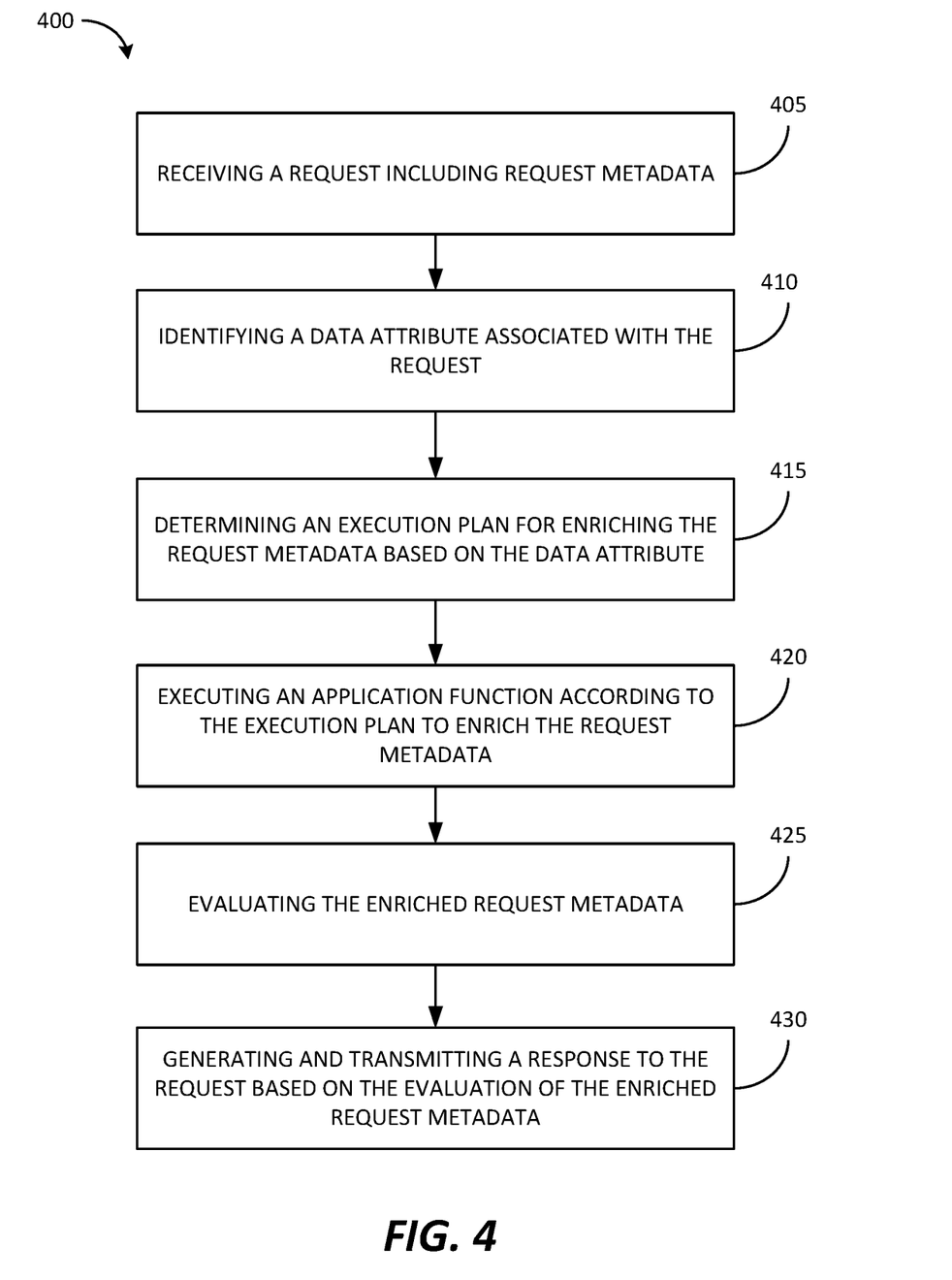
FIG. 4 is a flow chart of a method of request orchestration using the system of FIG. 1 according to some embodiments.

FIG. 4 is a flowchart illustrating a method 400 for request orchestration according to some embodiments. The method 400 is described herein as being performed by the request orchestration server 110 (the electronic processor 200 executing instructions). However, as noted above, the functionality performed by the request orchestration server 110 (or a portion thereof) may be performed by other devices, including, for example, the customer server 105 (via an electronic processor executing instructions).

As seen in FIG. 4, the method 400 includes receiving a request including request metadata (at block 405). A request may include, for example, authentication request, an authorization request, and the like. For example, a request may be associated with a user attempting to log-in to an account associated with the user, such as an ecommerce account or a financial services account. As noted above, the request includes request metadata (or a set of data attributes associated with the request). Request metadata may include, for example, a virtual location, such as an IP address, associated with the request, a user agent, such as a web browser, associated with the request, and the like.

In response to receiving the request, the electronic processor 200 identifies a data attribute associated with the request (at block 410). In some embodiments, the electronic processor identifies a set of data attributes that includes one or more data attributes (for example, a first data attribute, a second data attribute, and the like). The set of data attributes associated with the request may include one or more data attributes included in the request metadata of the request, such as a virtual location, a user agent, user agent information, and the like.

The electronic processor 200 then determines an execution plan for enriching the request metadata based on the data attribute (at block 415). An execution plan refers to a request orchestration plan for executing application functionality triggered by the data attribute(s) included in the request (or request metadata). In some embodiments, the electronic processor 200 determines the execution plan by accessing an application function 300, an association 305, or a combination thereof from the application functionality database 115. As noted above, an association 305 may include a mapping between a particular data attribute and one or more of the application functions 300. Accordingly, in some embodiments, the electronic processor 200 determines the execution plan by accessing an association 305 mapping the data attribute to one or more application functions 300 associated with that data attribute.

As noted above, in some embodiments, the electronic processor 200 determines a set of data attributes. In such embodiments, the electronic processor 200 may determine an execution plan that includes or identifies one or more application functions 300 for each data attribute included in the set of data attributes. For example, the execution plan may include a first application function associated with a first data attribute, a second application function associated with a second data attribute, and the like.

After determining the execution plan (at block 415), the electronic processor 200 then executes the execution plan. For example, as illustrated in FIG. 4, the electronic processor 200 executes an application function 300 according to the execution plan to enrich the request metadata (at block 420).

The electronic processor 200 may execute the application function 300 by requesting enrichment information 310 (or a portion thereof) associated with the data attribute from the enrichment database 120. In response to receiving the enrichment information 310, the electronic processor 200 may supplement the request metadata with the enrichment information 310 (or a portion thereof). As noted above, the enrichment information 310 may include, for example, velocity information associated with the data attribute, GeoIP information associated with the data attribute, user agent information associated with the data attribute, fraud health information associated with the data attribute, and the like. As one example, when the data attribute is an IP address associated with the request, the enrichment information may include information relating to fraud health for that IP address. In this example, the enriched request metadata includes the IP address and the supplemented fraud health information for that IP address.

Alternatively or in addition, the electronic processor 200 may execute the application function 300 by requesting evaluation list information associated with the data attribute from the list database 125. Evaluation list information may include a result of performing an evaluation list lookup, such as blocked, allowed, or the like. In other words, evaluation list information may include a result of looking up the data attribute in one or more of the evaluation lists 315 stored in the list database 125. Accordingly, evaluation list information may be a blocked indication, an allowed indication, a reputation indication, or the like. In response to receiving the evaluation list information, the electronic processor 200 may supplement the request metadata with the evaluation list information (or a portion thereof). As one example, when the data attribute is an IP address associated with the request, the evaluation list information may include a reputation metric associated with the IP address.

In some embodiments, the electronic processor 200 executes more than one application function 300 (for example, a second application function, a third application function, and the like). For example, when a set of data attributes includes a first data attribute and a second data attribute, the electronic processor 200 may execute a first application function for the first data attribute and a second application function for the second data attribute. In some embodiments, the electronic processor 200 executes the application functions 300 asynchronously.

As seen in FIG. 4, the method also includes evaluating, with the electronic processor 200, the enriched request metadata (at block 425). The electronic processor 200 evaluates the enriched request metadata by applying a model developed using machine learning (for example, one or more of the models 320) to the enriched request metadata. Accordingly, in some embodiments, the electronic processor 200 accesses one or more of the models 320 stored in the models database 130 and applies the one or more models 320 to the enriched request metadata. The electronic processor 200 evaluates the enriched request metadata to determine an evaluation status for the request. An evaluation status may include or indicate whether the request is fraudulent, whether the request is valid, whether application behavior associated with the request is allowed or blocked, and the like.

After evaluating the enriched request metadata (at block 425), the electronic processor 200 generates and transmits a response to the request based on the evaluation of the enriched request metadata (at block 430). In some embodiments, the response includes the evaluation status for the request. Alternatively or in addition, the response may include the enriched request metadata. The electronic processor 200 may transmit the response to the customer server 105 associated with the request (i.e., the customer server 105 that the request was originally received from).

In some embodiments, the electronic processor 200 determines a time out parameter. A time out parameter is a time duration for executing one or more of the application functions 300. In other words, the time out parameter limits or constrains the amount of time allowed for executing one or more of the application functions 300. Accordingly, in some embodiments, the electronic processor 200 times out one or more of the application functions 300 according to the time out parameter. For example, when a request is associated with a user trying to check out on an ecommerce web application, the time out parameter may specify that when an application function takes longer than 20 seconds, to time out the application function. In other words, upon expiration of the time duration set by the time out parameter, the electronic processor 200 times out (or stops) the execution of any outstanding (or remaining) application functions 300. Accordingly, by implementing a time out parameter, the system 100 is able to maintain performance objectives in the event of an issue.

Additionally, in some embodiments, the electronic processor 200 receives an updated association for a set of data attributes. The updated association may map one or more data attributes to one or more different application functions, such as a newly created or customized application function. In response to receiving the updated association, the updated association may be implemented in real time (or near real time). In other words, the application functionality may be customized on demand without impacting regular operation of the system 100. In other words, updates to application functionality do not directly impact application functionality, and, thus, enables incremental functionality growth and extension, such as incremental improvements to an application programming interface (API).

Figure 5:
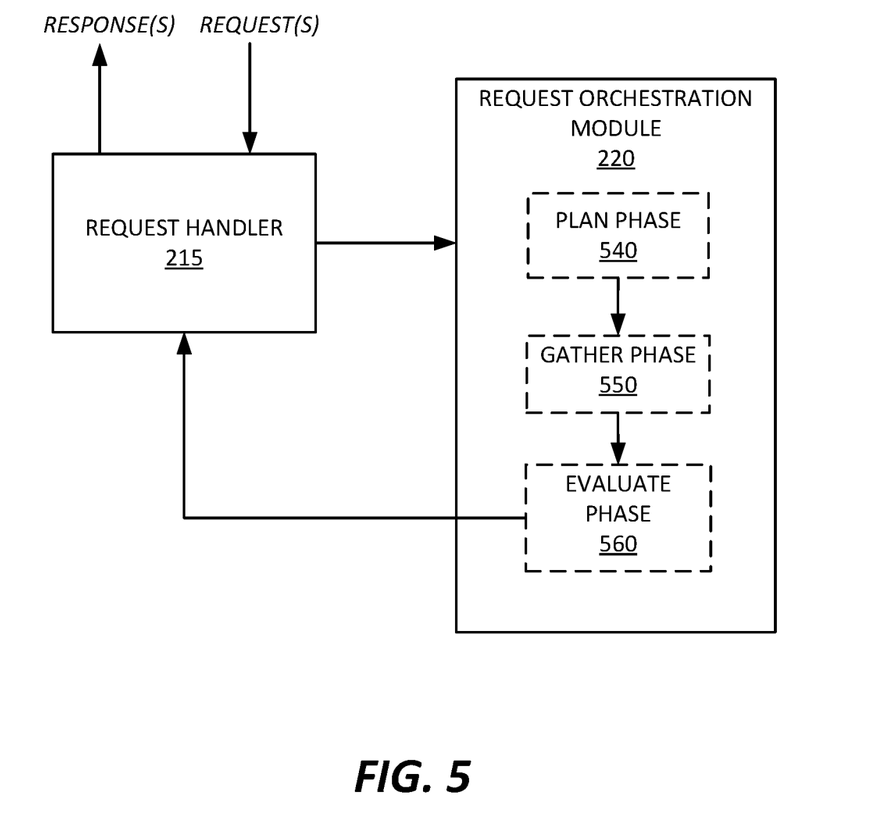
FIG. 5 illustrates a flow of communication or data between a request handler and a request orchestration module according to some embodiments.

FIG. 5 illustrates the flow of communication or data between the request handler 215 and the request orchestration module 220 when the method 400 is implemented using the system 100 according to some embodiments. As seen in FIG. 5, requests are received via the request handler 215. Accordingly, in some embodiments, the request handler 215 acts as an application entry point (or gateway). In response to receiving the request, the request handler 215 forwards or pushes configuration and request data attributes into the request orchestration module 220. As seen in FIG. 4, the functionality associated with the request orchestration module 220 may include a plan phase 540, a gather phase 550, and an evaluate phase 560. In the plan phase 540, the request orchestration module 220 inspects the data attributes in the request and determines a plan to execute application functionality (for example, a plan for orchestrating requests associated with executing the application functionality triggered by the data attributes). In the gather phase 550, the request orchestration module 220 executes the application functionality according to the plan. For example, the request orchestration module 220 executes look ups and data queries against, for example, the enrichment database 120, the list database 125, or a combination thereof. The request orchestration module 220 then enriches the request metadata based on, for example, the enrichment information 310, the evaluation list 315, or a combination thereof. In the evaluate phase 560, the request orchestration module 220 evaluates the enriched request metadata using a machine learning model (for example, a model 320 stored in the models database 130). After evaluating the enriched request metadata, the request orchestration module pushes or forwards a response (or profiled request) to the request handler 215.

Thus, the embodiments described herein provide, among other things, methods and systems for request orchestration. Various features and advantages of the invention are set forth in the following claims.

What is claimed is:

1. A system for request orchestration, the system comprising:
   an electronic processor configured to
      receive a request including request metadata,
      identify a data attribute associated with the request,
      determine an execution plan for enriching the request metadata based on the data attribute and an application function, the execution plan including an orchestration of requests associated with executing application functionality triggered by the data attribute, wherein the electronic processor is further configured to
      access the application function in an application functionality database using the data attribute,
      execute the application function according to the execution plan to enrich the request metadata,
      evaluate the enriched request metadata, and
      generate and transmit a response to the request based on the evaluation of the enriched request metadata.

2. The system of claim 1, wherein the response includes an evaluation status for the response.

3. The system of claim 2, wherein the evaluation status indicates includes at least one selected from a group consisting of whether the request is fraudulent, whether the request is valid, and whether application behavior associated with the request is allowed.

4. The system of claim 1, wherein the electronic processor executes the application function by requesting enrichment information associated with the data attribute from an enrichment database, and in response to receiving the enrichment information, supplementing the request metadata with the enrichment information as the enriched request metadata.

5. The system of claim 4, wherein the enrichment information includes at least one selected from a group consisting of velocity information associated with the data attribute, GeoIP information associated with the data attribute, user agent information associated with the data attribute, and fraud health information associated with the data attribute.

6. The system of claim 1, wherein the electronic processor executes the application function by requesting evaluation list information associated with the data attribute from a list database, and in response to receiving the evaluation list information, supplementing the request metadata with the evaluation list information as the enriched request metadata.

7. The system of claim 1, wherein the application function is a lookup function associated with the data attribute.

8. The system of claim 1, wherein the electronic processor is configured to evaluate the enriched request metadata by applying a model developed using machine learning to the enriched request metadata.

9. The system of claim 1, wherein the electronic processor is configured to determine a time out parameter for the application function, and time out the execution of the application function according to the time out parameter.

10. The system of claim 1, wherein the electronic processor is configured to determine the execution plan by accessing an association mapping the data attribute to the application function.

11. The system of claim 10, wherein the electronic processor is configured to receive an updated association for the data attribute, wherein the updated association maps the data attribute to a different application function.

12. A method for request orchestration, the method comprising:

receiving a request including request metadata;

identifying, with an electronic processor, a set of data attributes associated with the request;

determining, with the electronic processor, an execution plan for enriching the request metadata based on the set of data attributes and one or more application functions, the execution plan including an orchestration of requests associated with executing application functionality triggered by the set of data attributes, wherein determining the execution plan further comprises:

accessing, with the electronic processor, the one or more application functions in an application functionality database using the set of data attributes;

executing, with the electronic processor, the one or more application functions according to the execution plan to enrich the request metadata;

evaluating, with the electronic processor, the enriched request metadata; and generating and transmitting, with the electronic processor, a response to the request based on the evaluation of the enriched request metadata.

13. The method of claim 12, wherein determining the execution plan includes determining a first application function associated with a first data attribute included in the set of data attributes and a second application function associated with a second data attribute included in the set of data attributes.

14. The method of claim 13, wherein executing the one or more application functions according to the execution plan includes executing the first application function for the first data attribute and executing the second application function for the second data attribute.

15. The method of claim 12, further comprising:

determining a time out parameter for the one or more application functions, and timing out the execution of the one or more application functions according to the time out parameter.

16. The method of claim 12, wherein evaluating the enriched request metadata includes accessing a model developed using machine learning; and applying the model to the enriched request metadata.

17. The method of claim 12, wherein executing the one or more application functions includes accessing at least one selected from a group consisting of velocity information associated with the set of data attributes, GeoIP information associated with the set of data attributes, user agent information associated with the set of data attributes, fraud health information associated with the set of data attributes, and an evaluation list associated with the set of data attributes.

18. A non-transitory, computer-readable medium storing instructions that, when executed by an electronic processor, perform a set of functions, the set of functions comprising:

receiving a request including request metadata;

identifying a set of data attributes associated with the request, the set of data attributes including a first data attribute and a second data attribute;

determining an execution plan for enriching the request metadata based on the set of data attributes, a first application function, and a second application function, the execution plan including an orchestration of requests associated with executing application functionality triggered by the set of data attributes, wherein the execution plan includes the first application function associated with the first data attribute and the second application function associated with the second data attribute, wherein the set of functions also includes:

accessing the first application function and the second application function in an application functionality database using the set of data attributes;

executing the first application function and the second application function according to the execution plan to enrich the request metadata;

evaluating the enriched request metadata; and generating and transmitting a response to the request based on the evaluation of the enriched request metadata.

19. The computer-readable medium of claim 18, wherein evaluating the enriched request metadata includes applying a model developed using machine learning to the enriched request metadata to determine an evaluation status for the request.

20. The computer-readable medium of claim 18, wherein executing the first application function and the second application function includes executing the first application function and the second application function asynchronously.

* * * * *